(12) United States Patent
Deen et al.

(10) Patent No.: US 8,391,481 B2
(45) Date of Patent: Mar. 5, 2013

(54) REBINDING OF CONTENT TITLE KEYS IN CLUSTERS OF DEVICES WITH DISTINCT SECURITY LEVELS

(75) Inventors: Robert Glenn Deen, San Jose, CA (US); Hongxia Jin, San Jose, CA (US); Sigfredo Ismael Nin, Morgan Hill, CA (US); Dulce B. Ponceleon, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 12/651,382

(22) Filed: Dec. 31, 2009

(65) Prior Publication Data

US 2011/0158404 A1 Jun. 30, 2011

(51) Int. Cl.
 *H04L 29/06* (2006.01)
(52) U.S. Cl. .......................................... 380/44
(58) Field of Classification Search ............ 380/44, 380/45
 See application file for complete search history.

(56) References Cited

U.S. PATENT DOCUMENTS

| 2003/0198351 | A1 | 10/2003 | Foster et al. |
| 2003/0200176 | A1 | 10/2003 | Foster et al. |
| 2004/0139338 | A1 * | 7/2004 | Ohmori et al. ............. 713/193 |
| 2006/0126831 | A1 * | 6/2006 | Cerruti et al. ............... 380/30 |
| 2006/0179489 | A1 * | 8/2006 | Mas Ribes ................... 726/27 |
| 2006/0262927 | A1 | 11/2006 | Rutkowski et al. |
| 2006/0265338 | A1 | 11/2006 | Rutkowski et al. |
| 2009/0193262 | A1 * | 7/2009 | Sweazey ..................... 713/182 |

FOREIGN PATENT DOCUMENTS

WO WO2006122938 11/2006

OTHER PUBLICATIONS

Ancona, D. et al., "Mixin Modules for Dynamic Rebinding", Trustworthy Global Computing, International Symposium, Edinburgh, Apr. 7-9, 2005, TGC 2005 Revised Selected Papers (Lecture Notes in Computer Science, vol. 3705).

* cited by examiner

*Primary Examiner* — Jason Gee
(74) *Attorney, Agent, or Firm* — Cantor Colburn LLP

(57) ABSTRACT

According to one embodiment of the present invention, a system, method, and computer program product is provided for rebinding title keys in clusters of devices with distinct security levels in broadcast encryption systems. The method includes receiving a new management key and unbinding an encrypted title key with a previously used management key, the title key having a security class and residing in a title key block for a device having a security class, the device being in a cluster of devices including devices having a plurality of security classes. If the device security class is lower that the title key security class, the unbound title key is partially rebound with the new management key. the partially rebound title key is then saved in the title key block for the device.

17 Claims, 5 Drawing Sheets

US 8,391,481 B2

REBINDING OF CONTENT TITLE KEYS IN CLUSTERS OF DEVICES WITH DISTINCT SECURITY LEVELS

BACKGROUND

The present invention relates to content protection, and more specifically, to clusters of devices with distinct security levels.

Broadcast encryption is an important cryptographic key management approach, especially useful in content protection systems. Two popular broadcast-encryption-based systems are the Content Protection for Recordable Media (CPRM) system from IBM, Intel, Panasonic, and Toshiba, and the Advanced Access Content System (AACS) from Disney, IBM, Intel, Microsoft, Panasonic, Sony, Toshiba, and Warner Bros.

Another example of broadcast encryption is IBM's Advanced Secure Content Cluster Technology (ASCCT), which is useful, for example, where a consumer might have a library of entertainment content in his home, and wants that library to be freely viewed by all the devices he owns. ASCCT uses broadcast encryption to build a cluster of devices to which content can be cryptographically bound to prevent unauthorized copying.

ASCCT uses broadcast encryption based on a Management Key Block (MKB) which is similar to that used by the Advanced Access Content System (AACS) to protect Blu-Ray high definition DVD discs. ASCCT devices exchange a set of messages on a network to establish a cluster of devices each of which shares the same management key block. An ASCCT device uses its set of secret Device keys to process the MKB, and thereby obtain secret keys that enable it to participate in the cluster and gain access to protected content. Both the MKB and Device keys are issued by a licensing authority which oversees the management of the broadcast encryption system.

SUMMARY

According to one embodiment of the present invention, a method comprises: receiving a new management key in a device having a security class level, in an ordered hierarchy of levels, the device being in a cluster of devices including devices having a plurality of security classes; calculating a new binding key for the security class based on the new management key and other values; rebinding a bound title key encrypted with a previously used binding key, the bound title key having a security class designated by the security class of the previously used binding key; if the device security class is lower than the security class of the bound title key, doubly binding the bound title key by encrypting with the new management key, and saving the doubly bound title key; and if the device security class is not lower than the security class of the bound title key, rebinding the bound title key by decrypting with the old binding key for the security class of the bound key, and encrypting with the new binding key for the security class of the bound title key.

According to another embodiment of the present invention, a method comprises: receiving a new management key in a device having a security class; receiving a title key block having a preexisting doubly encrypted title key with an outermost layer that was encrypted using a preexisting management key; if the device security class is lower than the security class of the preexisting doubly bound title key, using the device to partially rebind the doubly encrypted title key by removing the outermost layer of encryption using the pre-existing management key and doubly encrypting the bound title key in part using the new management key, and storing the doubly encrypted title key in a title key block; if the device security class is not lower than the security class of the pre-existing doubly bound title key, using the device to rebind the doubly encrypted title key by removing the outermost layer of encryption using the pre-existing management key, removing the innermost layer of encryption using the old binding key, reencrypting the title key with the new binding key for the security class of the bound title key, and storing the rebound title key in a title key block.

According to a further embodiment of the present invention, a system comprises: a cluster of devices connected by a network, the devices having a plurality of security classes; each device having the same management key block, and each device having access to a title key block, the title key block including bound title keys having a plurality of security classes; and each device having a processor for rebinding the bound title keys when a new management key block is present, wherein, if the device security class is lower than the security class of the bound title key, the processor doubly binds the bound title key by encrypting with the new management key, and saving the doubly bound title key in the title key block for the bound content; and if the device security class is not lower than the security class of the bound title key, the processor partially rebinds the bound title key, by decrypting with the old binding key for the security class of the bound key, and encrypting with the new binding key for the security class of the bound key, and saving the rebound title key in the title key block for the bound content; wherein the rebound title key is then stored in the title key block.

According to another embodiment of the present invention, a computer program product for rebinding content title keys in clusters of devices with distinct security levels comprises: a computer usable medium having computer usable program code embodied therewith, the computer usable program code comprising: computer usable program code configured to: receive a new management key in a device having a security class level, in an ordered hierarchy of levels, the device being in a cluster of devices including devices having a plurality of security classes; calculate a new binding key for the security class based on the new management key and other values; rebind a bound title key encrypted with a previously used binding key, the bound title key having a security class designated by the security class of the previously used binding key, the bound title key residing in a title key block for a bound content item, the title key block being managed by the device having a security class; if the device security class is lower than the security class of the bound title key, doubly bind the bound title key by encrypting with the new management key, and save the doubly bound title key in the title key block for the bound content; and if the device security class is not lower than the security class of the bound title key, rebind the bound title key, by decrypting with the old binding key for the security class of the bound key, and encrypting with the new binding key for the security class of the bound key, and save the rebound title key in the title key block for the bound content.

DETAILED DESCRIPTION

Figure 1:
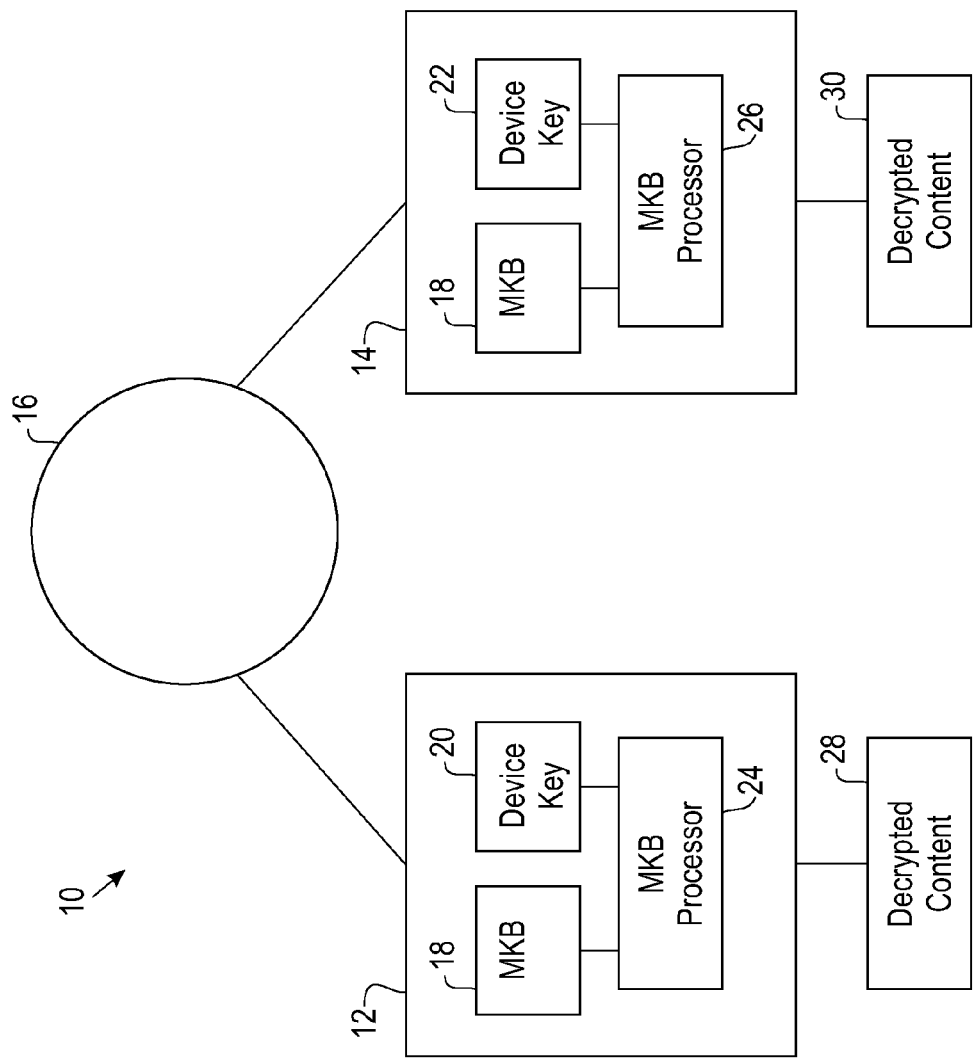
FIG. 1 shows a diagram of a cluster of digital media devices in accordance with an embodiment of the invention.

Embodiments of the invention provide techniques for rebinding of title keys in clusters of devices with distinct security levels in broadcast encryption systems such as ASCCT. In ASCCT systems content items, such as movies, music, or any other digitally stored information are protected by encrypting the content item with a Title Key (Kt). For a given piece of content there is a single title key which is used to encrypt it. To protect the title key from unauthorized use, the title key is then encrypted with a binding key. The binding key is a value shared by all devices in an ASCCT cluster. This restricts use of the bound content to only being usable by devices in the same cluster. Thus, only devices in the cluster can decrypt the title key, and in turn use it to decrypt the bound content. The binding key is created by combining several different items of data together to produce a key suitable for use with the encryption algorithm that was used to encrypt the title key. The binding key computation includes a value known as the Management Key (Km) taken from the shared MKB used by the cluster, and properties of the cluster which are only known to devices which are members of the cluster.

As a result of the above configuration: 1) Devices must be valid authorized devices that have device keys from the licensing authority which can decode the MKB, and 2) Devices must be members of the specific cluster instance so as to have knowledge of the cluster instance properties used to calculate the binding key.

When the values used by a cluster to calculate the binding key change, the binding key used by the cluster is recalculated and replaced by the new value. This creates a need to rebind the content bound to the cluster, that is, to re-encrypt all of the title keys with the new binding key. The title key for each content item is decrypted using the old binding key, and then encrypted with the new binding key. This is action is known as rebinding of title keys.

In summary,

1) ASCCT builds a cluster of devices which use broadcast encryption in the form of a common Management Key Block (MKB) and secret device keys issued by a licensing authority.

2) Content is protected from unauthorized use by encrypting each item with a title key which may be distinct or reused by different content items.

3) The cluster computes a binding key which is derived using both information in the MKB, such as the management key (Km) which is unlocked using device keys, and local cluster information which is only known to devices in the cluster.

4) The title key used for a content item is encrypted with the cluster's binding key, restricting access to the title key, and the content encrypted with it, to only the devices in the cluster.

Broadcast encryption is susceptible to an attack known as the "anonymous attack". An attacker uses one or more sets of stolen device keys to enable a device to make unauthorized copies of content. To combat this, an enhancement to the management key blocks (MKBs) was created to provide forensic abilities in the event of an anonymous attack. This enhancement is described in U.S. patent application Ser. No. 12/356,067, entitled "Recording Keys in a Broadcast-Encryption-Based System", which is hereby incorporated by reference.

In the enhanced system, a title key is stored multiple times, with each instance encrypted with a different binding key. A new element is added to the MKB that provides a set of Recording Keys (Kr) that a device can use to encrypt the title key for bound content. In an ASCCT cluster, each recording key in the set, Kr0 through KrN, is used to form a set of Binding keys. The title key is then bound with each binding key in the set. This result is a set of encrypted title keys, one for each recording key, which are stored in a title key block (TKB).

To obtain a title key for a piece of content, a device need only use one binding key from the set, as decrypting any of the entries in the title key block yields the title key. The usefulness of this is that not all devices have access to the same set of recording keys. This is useful for forensic analysis as described in the above-described patent application entitled "Recording Keys in a Broadcast-Encryption-Based System". To make the system work, it is important when constructing the MKB that the recording key assignments are done in such a way that any two devices in the cluster will always have at least one recording key in common. Thus, a title key block produced on any device in the cluster has at least one entry which is accessible by each device in the same cluster, though different devices may use different entries to obtain the title key.

Another new addition to the construction of the MKB is described in patent application Ser. No. 12/192,962, entitled, "Security Classes in a Media Key Block", which is incorporated herein by reference. This patent application addresses the assignment of devices to different security classes. The security classes are arranged in levels, beginning with security class 0 for the least privileged devices, and increasing by 1 for each security class to a maximum fixed for a particular use of ASCCT. Previously, all devices calculated the same management key (Km) when they processed the MKB. In the new MKB design, devices assigned to the lowest security class still calculate the management key (Km) as found in the previous MKB design, but a device assigned to a higher security class calculates a management key precursor.

The management key precursor for each security class can be calculated using a cryptographic one-way function from the management key precursor of the next higher security class. Once a device has obtained its management key precursor by processing the MKB, it can compute the precursors for all lower security levels down to the 0th level, for which it computes the management key (Km).

For example, a device of class 8 can obtain the management key precursor Km8 from the MKB. It can then calculate Km8->Km7->Km6->Km5->Km4->Km3->Km2->Km1->Km0, where Km0 is also known as Km, which in the old scheme was the only management key. This allows a new binding key to be computed, which instead of using the management key, uses a management key precursor of a particular security class. Only devices assigned to a security class at the same level or higher will be able to produce such a binding key. A device uses its management key precursor to calculate its recording keys from the data in the MKB. This enables the device to produce the set of encrypted title keys in the title key block of an item of protected content so that the content can only be accessed by devices assigned to the same or higher security class.

Another very simple example is the following. Consider that the algorithm to produce a Management Key from a precursor is to add the value 5 to the precursor value. So if the Management Key is 100, the first precursor was 95, the second precursor was 90, and so forth. We refer to the precursor levels "first", "second", etc as the security class. When a device is given a Management Key Block holding a Management Key—the device will first extract the Management Key precursor at the level of the security class the device has been assigned to. The device can apply the precursor—to management key algorithm as many times as it needs to, until it has computed the management key.

The title key block introduces the ability to have different title keys for a single piece of content. In practice different title keys can exist for the same piece of content, which can be used by different security classes to process the data differently. This provides a means, for example, to separate two forms of the same content, perhaps high definition and standard definition content. Data can be held in the same file, but protected by the different title keys.

However, there is an issue with the above-described system. How can a device in a cluster rebind content which is protected by binding keys that are of a higher security class than the device doing the rebinding? The rebinding of title keys in clusters with distinct security levels could be done in a variety of ways.

One approach is for devices to simply skip, or not perform, the rebinding of content that has title keys protected by security classes the device does not have access to. One problem with this approach is that content protection is weakened. The rebinding operation is very likely being performed because a new MKB has been introduced that has newly revoked devices in it. If content is not rebound, devices which have been revoked in the new MKB could continue to access the content using the old MKB.

A second approach is that a device could rebind the title key block entries for which it does have the needed security class level, and delete from the block those entries which it cannot rebind. This approach maintains the strength of the content protection system, but it throws away the title keys protected at higher security levels. This can make inaccessible portions of the content that were protected with the lost title keys from higher security levels.

A third approach is for a device to rebind the levels permitted by its security class, and request that other devices in the cluster rebind the ones it cannot. The problem with this approach is that if no devices of higher level are present in the cluster, then the rebinding operation cannot be completed, which results in either the exposures of the first approach, or results in the loss of valuable title keys, as in the second Embodiments of the invention address the problems with these three solutions considered above, while avoiding the stated problems. In particular, in embodiments of the invention, a device rebinds the title keys at the device's security class level and below. For those title keys protected by higher security class level binding keys, the device partially rebinds the title key entries by encrypting the existing encrypted title key using the management key of the current MKB in use by the device. Since the management key is a key that can be calculated by all devices, regardless of security class, all devices (regardless of their security class) are able to decrypt this additional encryption and recover the original encrypted title key. However, only devices assigned to a sufficiently high security class can decrypt the original encrypted title key to recover the title key itself and do the rebinding.

To decrypt the original encrypted title key, a device must have access to the older MKB. That means the older MKB must be associated with the protected data, and must be retrievable by the device. Hence for files which have been partially rebound as described, the environment can retain the older MKB, which may be stored, for example, as part of the file holding the title key block, or in a separate file.

To reduce the number of older MKBs that need to be stored, a device may always first remove any previous partially rebound title keys, then re-perform the partial rebinding using the management key from the newest MKB. Only one MKB needs to be retained in addition to the device's current one. Thus, embodiments of the invention wraps the title key entries of higher security classes with a layer of encryption that requires that a device process the current MKB to gain access to them. This avoids the weakening from the first approach described above, and avoids the loss in the second approach.

In more detail, the Management Key is used as follows:

1. The management key precursor is used to compute the Recording Key(s) for the matching security class; The recording keys are additionally "bound" to either specific pieces of physical media (i.e., a specific physical DVD disc) or to a cluster of devices by additionally computing a bound recording key by mathematically combining the recording key value and value representing properties of the disc or cluster of devices. This bound recording key is then used to encrypt the title. Rebinding is done when any of the values which go into the bound recording key calculation change. The encrypted title key is decrypted using the old bound recording key, and then encrypted with the new bound recording key. It is then stored in the title key block.

2. If the device doing the rebinding is unable to calculate the old bound recording key value—because the device is not of a high enough security class to calculate the needed management key precursor—then the device cannot decrypt the encrypted title key in preparation for rebinding it. Instead, it encrypts the existing encrypted recording key using the NEW Management Key (a double encryption of the title key). This doubly encrypted title key is stored in the title key block.

3. If a device finds that an entry in the title key block is an encrypted title key that is "wrapped" (a doubly encrypted title key with the outermost layer encrypted by a management key, so the title key is "doubly bound"), and it is rebinding because the management key has changed but it is not of a high enough security class to unbind the title key, then it will "partially rebind" the title key by removing the outermost encryption with the old management key, encrypting the bound title key with the new management key, and storing the new doubly encrypted title key in the title key block.

The terms "bind", "wrap", and "rebind" as used herein, may be defined more precisely as follows.

1) Bind:

$E_{K_b^s}[K_T], s \leq s_{DEV}$, where the binding key, $K_b^s$, is constructed from the current binding information, including the current $K_m^s$, the media key predecessor for security level s.

2) Wrap (doubly bind—to the new MKB, as well as the old MKB and the cluster):

$E_{K_m}[\{E_{K_b^s}[K_T]\}]$, where $K_m$ is the current media key for security level 0.

NOTE: The notation { } means "value of"; that is, we're expecting to wrap a value computed earlier, not compute it now.

3) Rebind: unbind with the old binding key, $K_b^s$ then bind with the new binding key at the same security level, $K_{b-new}^s$. To do this, $s_{DEV} \geq s$; otherwise the device can only wrap (or re-wrap) the bound title key. Two possible cases are discussed below:

Case 1: the bound title key is not wrapped, that is, the bound title key itself is stored in the Title Key Block.
  (a) $s \leq s_{DEV}$ (simple case, follows from security class disclosure)
    i) Unbind with the old binding key which was computed from the old management key and other old binding information:

$D_{K_b^s}[\{E_{K_b^s}[K_T]\}] \to K_T$ ii) Bind with the new binding key computed from the new management key and/or other new binding information:

$E_{K_{b-new}^s}[K_T]$ (b) $s > s_{DEV}$ (cannot rebind, so wrap) Wrap with current $K_M$, (the new management key, if it was changed), then save the old binding information, including the MKB, and associate $K_T$ with old binding information:

$E_{K_m}[\{E_{K_b^s}[K_T]\}]$

Case 2: the bound title key is wrapped (done by device with $s_{DEV} < s$), that is, a doubly-bound (doubly-encrypted) title key is stored in the Title Key Block).
  (a) $s \leq s_{DEV}$
    i) Unwrap: $D_{K_{m-wrap}}[\{E_{K_{m-wrap}}[E_{K_{b-old}^s}[K_T]]\}]$
    ii) Unbind: $D_{K_{b-old}^s}[\{E_{K_{b-old}^s}[K_T]\}] \to K_T$
    iii) Bind: $E_{K_{b-new}^s}[K_T]$
      Note: $K_{m-wrap}$ may be $K_m$, the current management key, or $K_{m-old}$, the old management key being replaced.
    iv) Remove the association between $K_T$ and the old binding information (including the old MKB). Discard the old binding information if it is no longer associated with any title key.
  (b) $s > s_{DEV}$ (cannot rebind, so re-wrap)
    i) $K_{m-wrap} = K_m$: nothing to do, leave as is
    ii) $K_{m-wrap} = K_{m-old}$:
      unwrap: $D_{K_{m-old}}[\{E_{K_{m-old}}[E_{K_b^s}[K_T]]\}] \to \{E_{K_b^s}[K_T]\}$
      wrap: $E_{K_m}[\{E_{K_b^s}[K_T]\}]$ FIG. 1 shows a cluster of devices 10, which may comprise an ASCTT cluster. The cluster 10 includes any number of devices. For simplicity of illustration, only a first device 12 and a second device 14 are shown in FIG. 1. Each device 12, 14 are connected to each other through a network 16, which may comprise a wired or wireless network that is capable of distributing digital content.

Each device 12, 14 has a storage unit (not shown) that includes a management key block (MKB) 18, which as described above, is common to all devices in the cluster 10. Each device also stores a device key 20, 22, which is unique to the device. Each device also includes a MKB processor 24, 26, which processes the MKB and device key to produce decrypted content 28, 30, which is playable on a playback device, such as a digital media player (not shown). Embodiments of the invention use the MKB processor 24, 26 to perform processes described herein, including, but not limited to, binding, rebinding, encryption and decryption.

Figure 2:
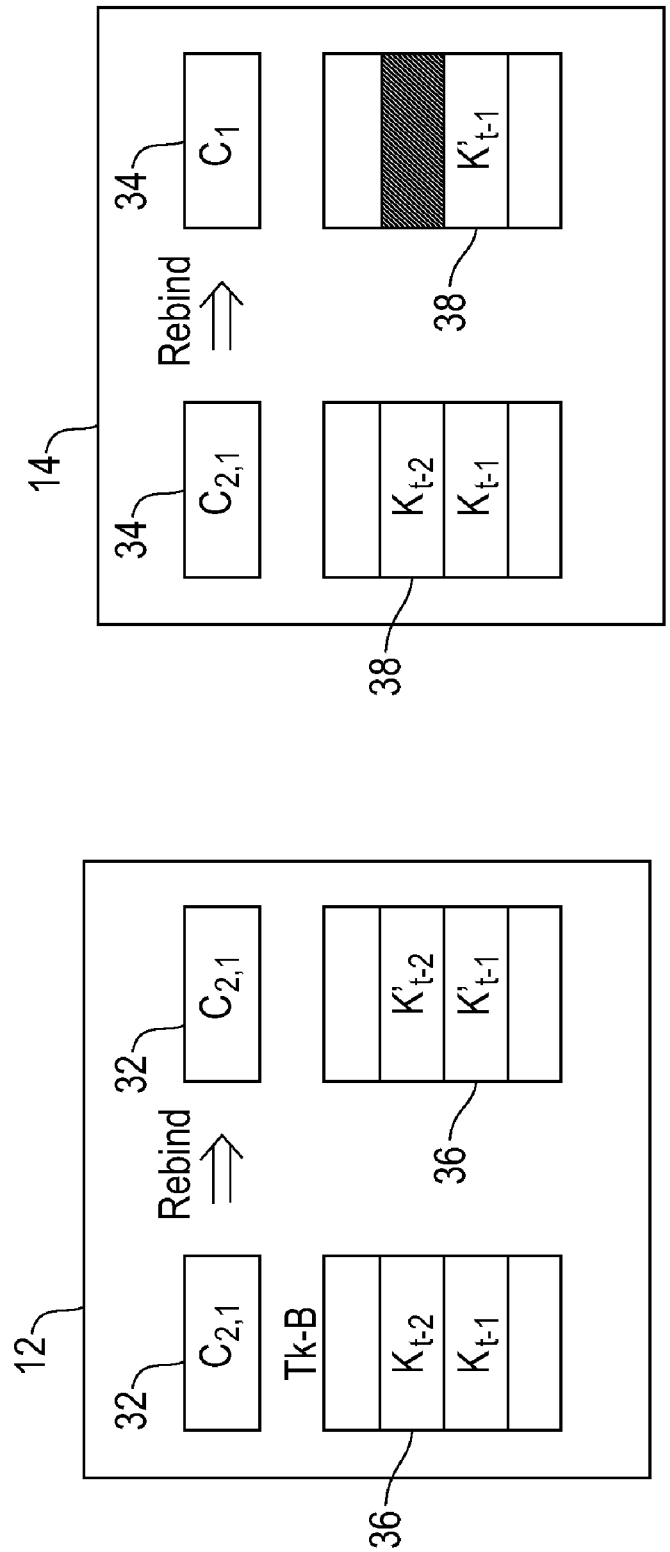
FIG. 2 shows a diagram of content and title key blocks in two devices that are part of the cluster shown in FIG. 1 in accordance with an embodiment of the invention.

FIG. 2 shows a diagram of the content and title key blocks in two devices that are part of the cluster 10 shown in FIG. 1. Each device 12, 14 may be a media player that is configured to play media having different security classes. For example, as indicated in FIG. 2, device 12 is configured to play content 32 of classes 1 and 2. This content 32 is labeled "$C_{2,1}$". Device 14 is configured to play only content 34 of class 1, as indicated by the label "$C_1$". Each device 12, 14 also stores a title key block 36, 38, which stores multiple title keys $K_t$. Title keys for content of security class 1 are labeled $K_{t-1}$, while title keys for content of security class 2 are labeled $K_{t-2}$. Title keys after the rebinding operation are labeled $K'_t$. As shown in FIG. 2, after the rebinding operation, the TKB in device 12 contains title keys for both security class 1 and security class 2 content. Device 14, however, after rebinding only contains title keys for content of security class 1, since it only performs a partial rebinding, as described above. Thus, the location for the title key for content of security class 2 is not present as indicated by the cross-hatching.

Figure 3:
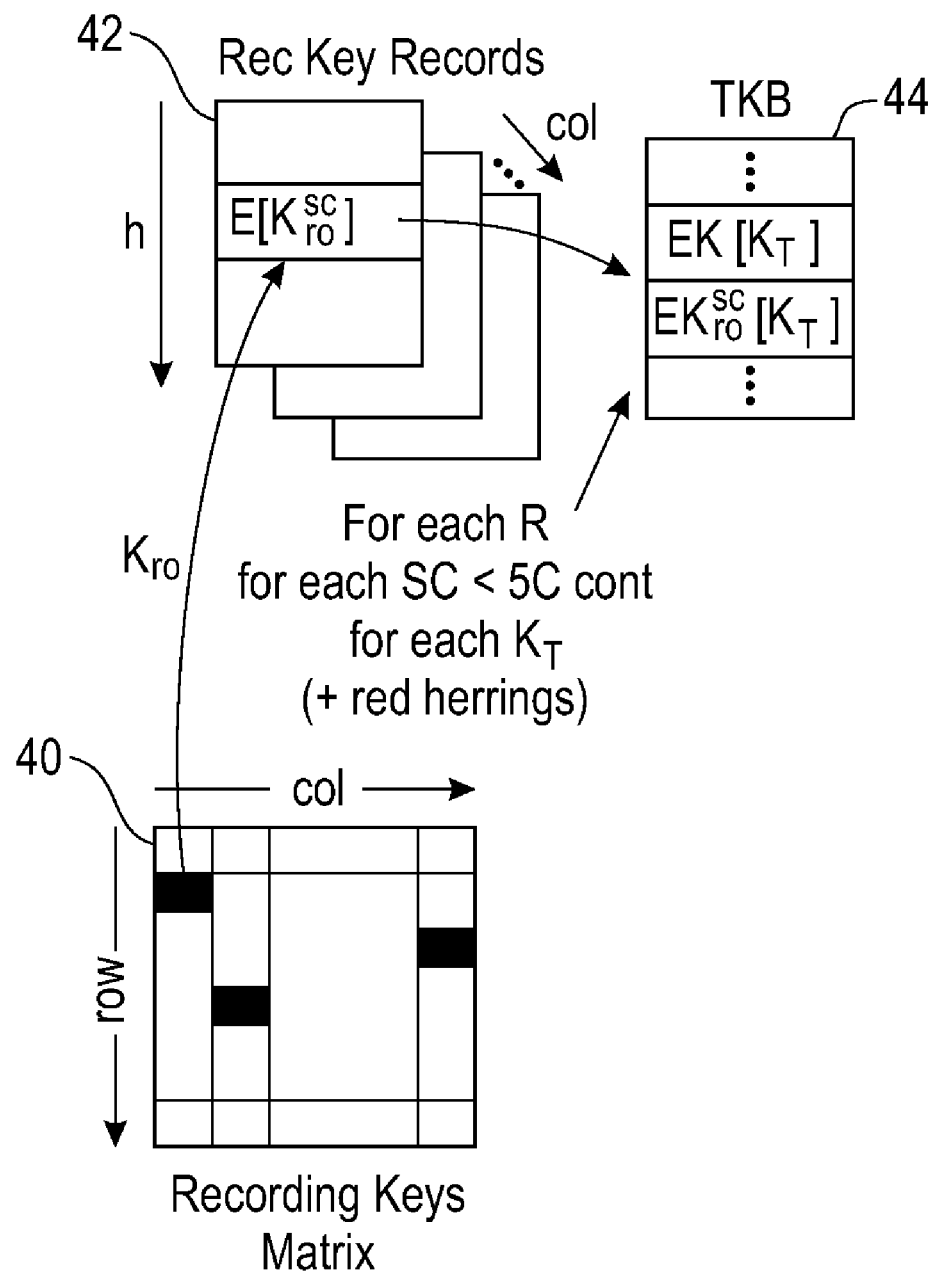
FIG. 3 shows additional details of the content of the title key blocks shown in FIG. 2 in accordance with an embodiment of the invention.

FIG. 3 shows details of the content of the title key blocks. In particular a recording key matrix 40, contains a set of recording keys (Kr). As described above, in general, recording keys are used by the device to encrypt the title keys. In an ASCCT cluster, each recording key in a set Kr0 through KrN, is used to form a set of binding keys. The title key is then bound with each binding key in the set. This results in a set of encrypted title keys, one for each recording key, which are stored in a title key block. One of the recoding keys, labeled Kr0, in the matrix is shown as being stored in a set of recording key records 42, which contains a recording key encrypted by the media variant key of the device labeled "$E[K_{r0}^{sc}]$" in FIG. 3. Once the recording key is decrypted from the recording key record, it is used to create the title key block 44.

Figure 4:
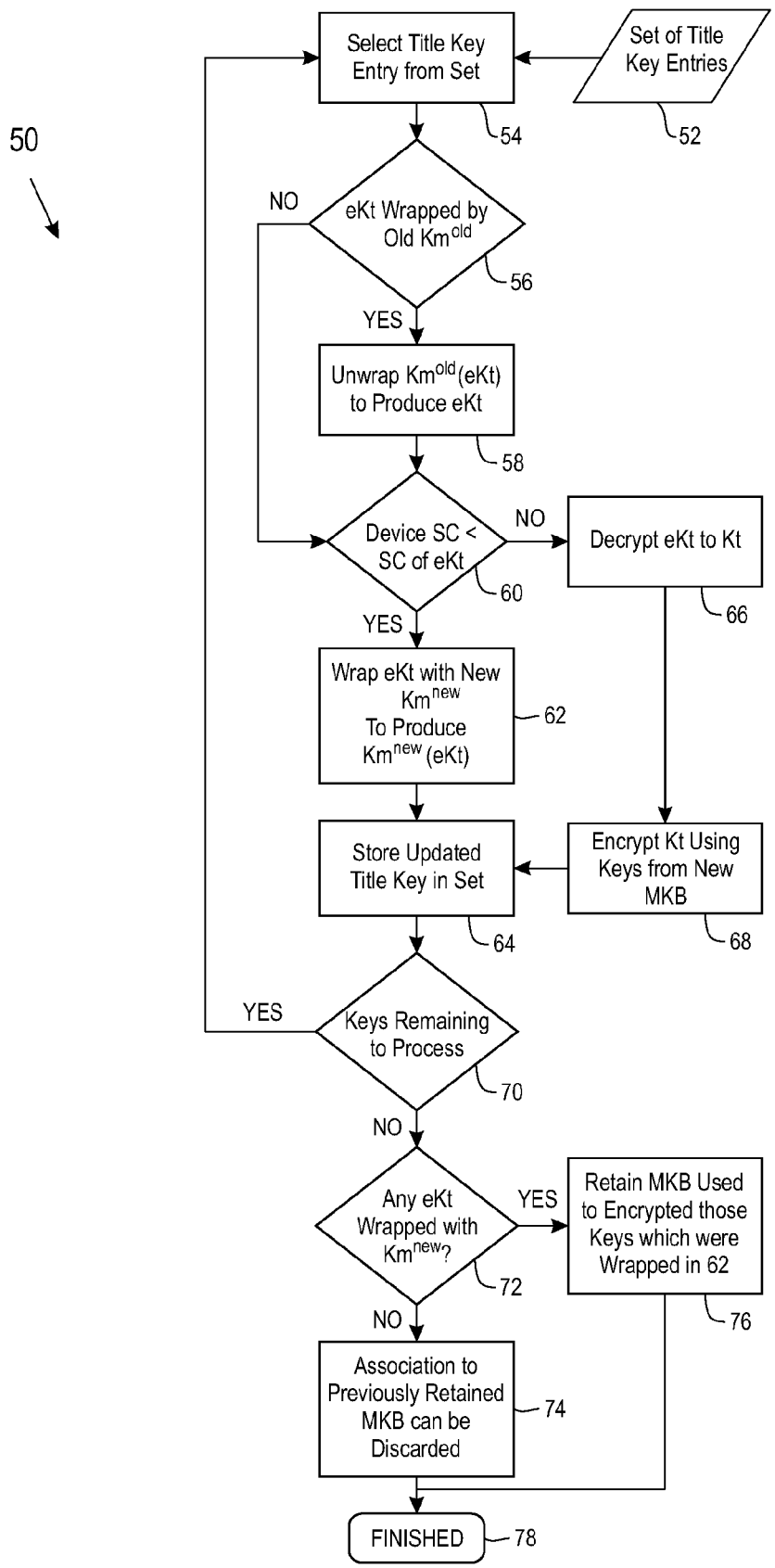
FIG. 4 shows a flowchart of a process for rebinding content title keys in clusters of devices with distinct security classes in accordance with an embodiment of the invention.

FIG. 4 shows a flowchart of a process 50 for rebinding content title keys in clusters of devices with distinct security classes, or levels. Process 50 may be performed, for example, when a device has been revoked and a new MKB needs to be established in an ASCCT cluster. In block 52, a set of title key entries in a device in the cluster are identified, which may reside in a title key block. In block 54, a title key is selected from the set of title keys in block 52. In block 56 the process determines if the title key, which is encrypted, (labeled eKt), is bound (also referred to as "wrapped") by an old management key, $Km^{old}$. If it is, block 58 unbinds this title key, $Km^{old}$, to produce an unbound title key eKt. Block 60 then determines if the security class, SC, of the device is less than the security class of the title key, eKt.

If block 56 determined instead that the title key was not bound by an old management key, then the process goes straight to block 60. If block 60 determines that the security class of the device is less than the security class of the title key eKt, then block 62 rebinds the title key with the new management key, $Km^{new}$ (eKt). Block 64 then stores the updated title key in the set of title keys. If, instead, block 60 determined that the security class of the device was not lower than the security class of the title key then block 66 decrypts the title key to product the unencrypted title key Kt, and block 68 encrypts the title key using keys from the new management key block.

Block 70 then determines if there are any title keys remaining to process and if so, the process returns to block 54. If there are no more title keys to process, block 72 determines if any title keys were bound with the new management key. If not, block 74 then discards any association to a previously retained management key block. If block 72 determines that there are title keys bound with the new management key, then block 76 retains the management key block used to encrypt those keys which were bound in block 62. The process ends at block 78.

As can be seen from the above disclosure, embodiments of the invention provide a method, system and computer program product for rebinding title keys in clusters of devices with distinct security levels in broadcast encryption systems.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction running system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction running system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
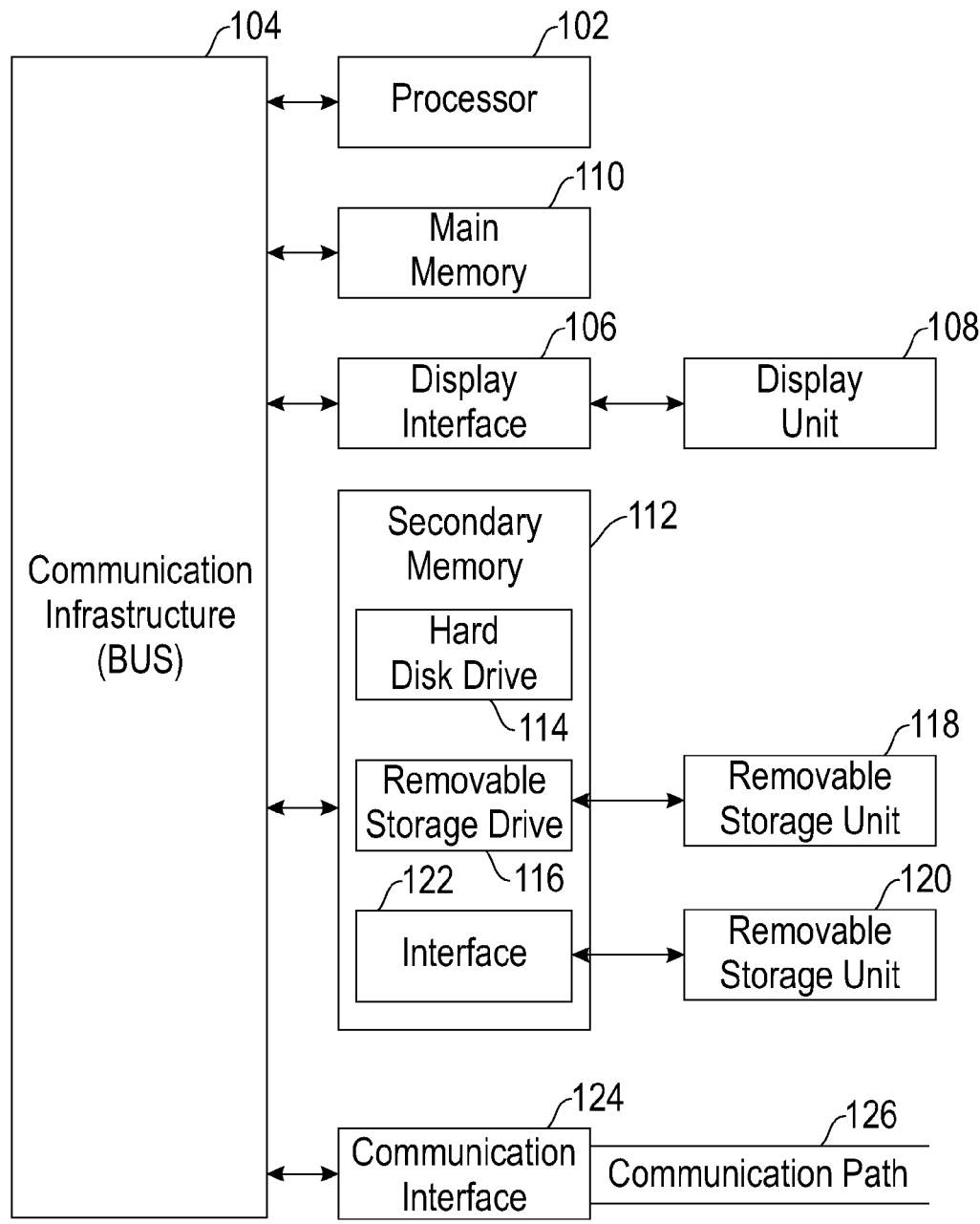
FIG. 5 shows a high level block diagram of an information processing system useful for implementing one embodiment of the present invention.

FIG. 5 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving a new management key in a device having a security class level, in an ordered hierarchy of levels, said device being in a cluster of devices including devices having a plurality of security classes;
   calculating a new binding key for said security class based on said new management key and other values;
   rebinding a bound title key encrypted with a previously used binding key, said bound title key having a security class designated by the security class of said previously used binding key;
   if said device security class is lower than the security class of said bound title key, doubly binding said bound title key by encrypting with said new management key, and saving said doubly bound title key; and
   if said device security class is not lower than the security class of said bound title key, rebinding said bound title key by decrypting with said old binding key for the security class of said bound key, and encrypting with said new binding key for the security class of said bound title key.

2. The method according to claim 1 further comprising repeating said receiving, calculating, rebinding, doubly binding, saving decrypting and saving for each encrypted title key in a title key block.

3. The method according to claim 2 further comprising retaining said old management key if any encrypted title keys in said title key block are encrypted with said new management key.

4. A method according to claim 3 further comprising discarding a previously retained management key if no encrypted title keys in said title key block are bound with said new management key.

5. A method according to claim 2 wherein said title key block comprises title keys for different forms of the same content, said different forms having different security classes.

6. A method according to claim 1 wherein said rebinding comprises partially rebinding title keys having a security class higher than said device security class.

7. A method according to claim 6 further comprising removing title keys which have been partially rebound prior to said rebinding with said new management key.

8. A method comprising:
   receiving a new management key in a device having a security class;

receiving a title key block having a preexisting doubly encrypted title key with an outermost layer that was encrypted using a preexisting management key;

if said device security class is lower than the security class of said preexisting doubly bound title key, using said device to partially rebind said doubly encrypted title key by removing said outermost layer of encryption using said pre-existing management key and doubly encrypting said bound title key in part using said new management key, and storing said doubly encrypted title key in a title key block;

if said device security class is not lower than the security class of the said preexisting doubly bound title key, using said device to rebind said doubly encrypted title key by removing said outermost layer of encryption using said preexisting management key, by removing said outermost layer of encryption using said pre-existing management key, removing the innermost layer of encryption using the old binding key, reencrypting the title key with the new binding key for the security class of said bound title key, and storing said rebound title key in a title key block.

9. The method according to claim 8, wherein said removing comprises using said preexisting management key.

10. The method according to claim 8 wherein said pre-existing management key comprises a management key and a management key precursor.

11. The method according to claim 8 wherein said preexisting doubly encrypted title key was encrypted by using a management key precursor to compute a recording key and then by using recording key to encrypt said title key.

12. A system comprising:
a cluster of devices connected by a network, said devices having a plurality of security classes;
each devices having the same management key block, and each device having access to a title key block, said title key block including bound title keys having a plurality of security classes; and
each device having a processor for rebinding said bound title keys when a new management key block is present, wherein,
if said device security class is lower than the security class of said bound title key, said processor doubly binds said bound title key by encrypting with said new management key, and saving said doubly bound title key in said title key block for said bound content; and
if said device security class is not lower than the security class of said bound title key, said processor partially rebinds said bound title key, by decrypting with said old binding key for the security class of said bound key, and encrypting with said new binding key for the security class of said bound key, and saving the rebound title key in said title key block for said bound content;
wherein said rebound title key is then stored in said title key block.

13. The system according to claim 12 wherein,
each device having a processor for rebinding said doubly bound title keys when a new management key block is present, wherein,
if said device security class is lower than the security class of said bound title key, said processor partially rebinds said bound title key by removing said outermost layer of encryption using said pre-existing management key, doubly encrypting said bound title key in part using said new management key, and storing said doubly encrypted title key in a title key block for said bound content; and
if said device security class is not lower than the security class of said bound title key, said processor rebinds said bound title key by removing said outermost layer of encryption using said pre-existing management key, removing the innermost layer of encryption using the old binding key, reencryption the title key with the new binding key for the security class of said bound title key, and storing said rebound title key in a title key block for said bound content.

14. A system according to claim 12 wherein said management key includes a binding key used to decrypt and encrypt said title key.

15. A computer program product for rebinding content title keys in clusters of devices with distinct security levels, said computer program product comprising:
a non-transitory computer readable storage medium having a computer readable program code embodied therewith, said computer readable program code comprising:
computer readable program code configured to:
receive a new management key in a device having a security class level, in an ordered hierarchy of levels, said device being in a cluster of devices including devices having a plurality of security classes;
calculate a new binding key for said security class based on said new management key and other values;
rebind a bound title key encrypted with a previously used binding key, said bound title key having a security class designated by the security class of said previously used binding key, said bound title key residing in a title key block for a bound content item, said title key block being managed by said device having a security class;
if said device security class is lower than the security class of said bound title key, doubly bind said bound title key by encrypting with said new management key, and save said doubly bind said bound title key in said title key block for said bound content; and
save said doubly bound title key in said title key block in for said bound content; and
if said device security class is not lower than the security class of said bound title key, rebind said bound title key, by decrypting with said old binding key for the security class of said bound key, and encrypting with said new binding key for the security class of said bound key and save the rebound title key in said title key block for said bound content.

16. A computer program product according to claim 15 wherein said computer readable program code is further configured to repeat said unbinding, rebinding, decrypting, encrypting, and saving for each encrypted title key in said title key block.

17. A computer program product according to claim 16 wherein said rebinding comprises partially rebinding doubly title keys having a security class higher than said device security class.

* * * * *